United States Patent
Bechtler et al.

(10) Patent No.: US 8,935,037 B2
(45) Date of Patent: *Jan. 13, 2015

(54) GOOD CHECKING FOR VEHICLE STEERING ANGLE SENSOR

(75) Inventors: Henrik Bechtler, Stuttgart (DE); Ravi Bhadange, Farmington, MI (US); Nachiket Patil, Farmington Hills, MI (US); Takeshi Tokonaga, Yokohama (JP); Stefan Mallmann, Lauffen (DE); Michael Schwab, Korntal (DE); Dietmar Stapel, Sendenhorst (DE); Willy Klier, Bloomfield Hills, MI (US); Joerg Eesmann, Rheine (DE)

(73) Assignee: Robert Bosch GmbH, Stuttgart (DE)

( * ) Notice: Subject to any disclaimer, the term of this patent is extended or adjusted under 35 U.S.C. 154(b) by 720 days.

This patent is subject to a terminal disclaimer.

(21) Appl. No.: 12/860,407

(22) Filed: Aug. 20, 2010

(65) Prior Publication Data

US 2011/0071727 A1 Mar. 24, 2011

Related U.S. Application Data

(60) Provisional application No. 61/236,409, filed on Aug. 24, 2009.

(51) Int. Cl.
  *G06F 19/00* (2011.01)
  *G01M 17/00* (2006.01)
  (Continued)

(52) U.S. Cl.
  CPC *G01D 3/08* (2013.01); *B62D 5/049* (2013.01); *B60T 8/885* (2013.01); *B60T 8/17551* (2013.01); *B60T 2250/06* (2013.01)
  USPC ........ 701/29.2; 701/29.1; 701/29.7; 701/29.8; 701/30.3

(58) Field of Classification Search
  USPC ........................................ 701/29.2
  See application file for complete search history.

(56) References Cited

U.S. PATENT DOCUMENTS 3,798,596 A * 3/1974 Sumiyoshi et al. ........... 340/461
3,803,425 A   4/1974 Carp
(Continued)

FOREIGN PATENT DOCUMENTS

| DE | 19936596 | 1/2001 |
| EP | 1227019 | 7/2002 |
| IT | 1116563 | 2/1986 |

OTHER PUBLICATIONS

EP10173774 European Search Report dated Nov. 30, 2010, 5 pages.
(Continued)

*Primary Examiner* — Calvin Cheung
*Assistant Examiner* — Krishnan Ramesh
(74) *Attorney, Agent, or Firm* — Michael Best & Friedrich LLP

(57) ABSTRACT

A controller for determining whether a previously-determined vehicle steering sensor malfunction still exists. The controller includes an electronic, non-volatile memory, and an electronic processing unit connected to the electronic, non-volatile memory. The electronic processing module includes a malfunction monitoring module, a failure handling module, and a signal checking module. The malfunction monitoring module monitors the operation of at least one vehicle sensor and generates a fault signal when the at least one sensor malfunctions. The failure handling module causes drive cycle information and the fault information to be stored in the electronic, non-volatile memory. The signal checking module performs a signal check on information from the at least one sensor.

20 Claims, 8 Drawing Sheets

(51) Int. Cl.
*G01N 33/30* (2006.01)
*G06F 7/00* (2006.01)
*G06F 11/30* (2006.01)
*G07C 5/00* (2006.01)
*G01D 3/08* (2006.01)
*B62D 5/04* (2006.01)
*B60T 8/88* (2006.01)
*B60T 8/1755* (2006.01)

(56) References Cited

U.S. PATENT DOCUMENTS

| | | | | |
|---|---|---|---|---|
| 3,916,375 | A * | 10/1975 | Sumiyoshi et al. | 340/461 |
| 4,219,244 | A | 8/1980 | Griner et al. | |
| 4,233,599 | A | 11/1980 | Brearley | |
| 4,234,866 | A * | 11/1980 | Kuroda et al. | 340/461 |
| 4,379,520 | A | 4/1983 | Tomsu | |
| 4,395,677 | A | 7/1983 | Petersdorf | |
| 4,484,119 | A | 11/1984 | Kerr | |
| 4,497,201 | A | 2/1985 | Allen et al. | |
| 4,609,905 | A | 9/1986 | Uzzo | |
| 4,648,662 | A | 3/1987 | Fennel et al. | |
| 4,785,295 | A | 11/1988 | Fukui et al. | |
| 4,839,811 | A * | 6/1989 | Kanegae et al. | 701/31.4 |
| 4,886,291 | A * | 12/1989 | Okamoto | 280/5.501 |
| 4,892,101 | A | 1/1990 | Cheung et al. | |
| 4,934,474 | A * | 6/1990 | Sugasawa | 180/414 |
| 4,953,652 | A * | 9/1990 | Ohmura et al. | 180/414 |
| 4,961,144 | A | 10/1990 | Yabe et al. | |
| 4,975,897 | A | 12/1990 | Tanahashi | |
| 4,996,657 | A * | 2/1991 | Shiraishi et al. | 702/151 |
| 5,008,823 | A * | 4/1991 | Takahashi | 701/30.9 |
| 5,014,801 | A * | 5/1991 | Hirose | 180/412 |
| 5,181,011 | A | 1/1993 | Okano | |
| 5,186,153 | A | 2/1993 | Steinbrenner et al. | |
| 5,190,522 | A | 3/1993 | Wojcicki et al. | |
| 5,200,911 | A * | 4/1993 | Ishikawa et al. | 701/43 |
| 5,201,380 | A * | 4/1993 | Callahan | 180/403 |
| 5,271,475 | A * | 12/1993 | Takeshita | 180/446 |
| 5,282,135 | A * | 1/1994 | Sato et al. | 701/43 |
| 5,283,740 | A * | 2/1994 | Sato et al. | 701/43 |
| 5,305,723 | A | 4/1994 | Kadota | |
| 5,357,141 | A | 10/1994 | Nitschke et al. | |
| 5,448,480 | A * | 9/1995 | Rauner et al. | 701/43 |
| 5,457,632 | A * | 10/1995 | Tagawa et al. | 701/43 |
| 5,473,147 | A | 12/1995 | Hoshino et al. | |
| 5,481,906 | A * | 1/1996 | Nagayoshi et al. | 73/114.61 |
| 5,485,379 | A | 1/1996 | Kremer | |
| 5,532,476 | A | 7/1996 | Mikan | |
| 5,544,073 | A | 8/1996 | Piety et al. | |
| 5,564,429 | A | 10/1996 | Bornn et al. | |
| 5,572,670 | A | 11/1996 | Puckett | |
| 5,594,228 | A | 1/1997 | Swartz et al. | |
| 5,636,121 | A | 6/1997 | Tsuyama et al. | |
| 5,642,180 | A | 6/1997 | Yoshida | |
| 5,671,981 | A * | 9/1997 | Sasaki et al. | 303/122.06 |
| 5,696,690 | A | 12/1997 | Richardson et al. | |
| 5,707,117 | A | 1/1998 | Hu et al. | |
| 5,710,704 | A | 1/1998 | Graber | |
| 5,712,784 | A | 1/1998 | Fendt et al. | |
| 5,748,483 | A | 5/1998 | Richardson et al. | |
| 5,752,208 | A | 5/1998 | Lerner | |
| 5,795,039 | A | 8/1998 | Fennel et al. | |
| 5,899,948 | A | 5/1999 | Raphael et al. | |
| 5,928,110 | A | 7/1999 | Vornehm et al. | |
| 5,959,529 | A | 9/1999 | Kail, IV | |
| 6,035,693 | A | 3/2000 | Horiuchi | |
| 6,134,491 | A * | 10/2000 | Kawagoe et al. | 701/43 |
| 6,144,904 | A * | 11/2000 | Tseng | 701/30.4 |
| 6,198,988 | B1 * | 3/2001 | Tseng | 701/1 |
| 6,212,465 | B1 * | 4/2001 | Sielagoski et al. | 701/96 |
| 6,225,901 | B1 | 5/2001 | Kail, IV | |
| 6,292,733 | B1 * | 9/2001 | Sugiyama et al. | 701/76 |
| 6,301,536 | B1 * | 10/2001 | Vaessen et al. | 701/45 |
| 6,305,760 | B1 | 10/2001 | Otake | |
| 6,354,607 | B1 * | 3/2002 | Kawashima et al. | 280/5.511 |
| 6,408,229 | B1 | 6/2002 | Loudon et al. | |
| 6,427,102 | B1 * | 7/2002 | Ding | 701/29.2 |
| 6,491,357 | B2 | 12/2002 | Holst | |
| 6,502,025 | B1 * | 12/2002 | Kempen | 701/41 |
| 6,519,515 | B1 * | 2/2003 | Baumann et al. | 701/30.9 |
| 6,577,948 | B1 * | 6/2003 | Skellenger et al. | 701/408 |
| 6,682,153 | B2 | 1/2004 | Okai | |
| 6,834,221 | B2 | 12/2004 | Jäger et al. | |
| 7,057,503 | B2 | 6/2006 | Watson | |
| 7,058,490 | B2 * | 6/2006 | Kim | 701/33.9 |
| 7,085,642 | B2 | 8/2006 | Samuel et al. | |
| 7,191,041 | B2 | 3/2007 | von Schwertfuehrer et al. | |
| 7,200,524 | B2 | 4/2007 | Kang et al. | |
| 7,286,083 | B2 | 10/2007 | Xie | |
| 7,823,986 | B2 | 11/2010 | Ruffer et al. | |
| 8,155,823 | B2 * | 4/2012 | Itoh | 701/31.7 |
| 8,159,945 | B2 | 4/2012 | Muro et al. | |
| 8,260,516 | B2 | 9/2012 | Bechtler et al. | |
| 8,401,730 | B2 * | 3/2013 | Bechtler et al. | 701/29.7 |
| 8,467,929 | B2 * | 6/2013 | Bechtler et al. | 701/30.3 |
| 2001/0044688 | A1 | 11/2001 | Okita et al. | |
| 2001/0051845 | A1 * | 12/2001 | Itoh | 701/43 |
| 2002/0075137 | A1 * | 6/2002 | Hofbeck et al. | 340/426 |
| 2002/0101115 | A1 * | 8/2002 | Holst | 303/122.03 |
| 2002/0113587 | A1 | 8/2002 | Kim | |
| 2002/0189889 | A1 * | 12/2002 | Demerly | 180/402 |
| 2003/0109939 | A1 | 6/2003 | Burgdorf et al. | |
| 2003/0149540 | A1 | 8/2003 | Kachel et al. | |
| 2004/0026148 | A1 * | 2/2004 | Matsuno | 180/248 |
| 2004/0030474 | A1 * | 2/2004 | Samuel et al. | 701/36 |
| 2004/0061500 | A1 | 4/2004 | Lou et al. | |
| 2004/0243287 | A1 * | 12/2004 | Yanaka et al. | 701/29 |
| 2005/0131602 | A1 * | 6/2005 | Souda | 701/34 |
| 2005/0228546 | A1 * | 10/2005 | Naik et al. | 701/1 |
| 2006/0173584 | A1 * | 8/2006 | Einig et al. | 701/1 |
| 2006/0181066 | A1 * | 8/2006 | Andres et al. | 280/735 |
| 2007/0129871 | A1 * | 6/2007 | Post et al. | 701/69 |
| 2007/0250183 | A1 | 10/2007 | Howell et al. | |
| 2007/0279207 | A1 | 12/2007 | Clark et al. | |
| 2007/0282558 | A1 * | 12/2007 | Sagisaka | 702/116 |
| 2008/0097671 | A1 * | 4/2008 | Kojo et al. | 701/43 |
| 2008/0176122 | A1 * | 7/2008 | Wake et al. | 429/24 |
| 2008/0183350 | A1 * | 7/2008 | Noguchi | 701/29 |
| 2008/0195275 | A1 * | 8/2008 | Kojo et al. | 701/36 |
| 2009/0055033 | A1 * | 2/2009 | Gansler et al. | 701/1 |
| 2009/0069978 | A1 * | 3/2009 | Inage | 701/41 |
| 2009/0164059 | A1 * | 6/2009 | Takeda | 701/29 |
| 2010/0014302 | A1 | 1/2010 | Okumura et al. | |
| 2010/0138105 | A1 | 6/2010 | Shibasaki et al. | |
| 2010/0269500 | A1 | 10/2010 | Ruffer et al. | |
| 2010/0274436 | A1 | 10/2010 | Kodaka et al. | |
| 2011/0066319 | A1 | 3/2011 | Bechtler et al. | |
| 2011/0066320 | A1 | 3/2011 | Bechtler et al. | |
| 2011/0066321 | A1 | 3/2011 | Bechtler et al. | |
| 2011/0068913 | A1 * | 3/2011 | Bechtler et al. | 340/506 |
| 2011/0071723 | A1 | 3/2011 | Bechtler et al. | |
| 2011/0071726 | A1 | 3/2011 | Bechtler et al. | |

OTHER PUBLICATIONS

Notice of Allowance from the United States Patent and Trademark Office for U.S. Appl. No. 12/860,376 dated Dec. 17, 2012 (11 pages).
Notice of Allowance from the United States Patent and Trademark Office for U.S. Appl. No. 12/860,362 dated Feb. 21, 2013 (11 pages).
Final Rejection from the United States Patent and Trademark Office for U.S. Appl. No. 12/860,370 dated Dec. 31, 2012 (22 pages).
Office Action from the United States Patent and Trademark Office for U.S. Appl. No. 12/860,396 dated Mar. 3, 2013 (16 pages).
Notice of Allowance from the United States Patent and Trademark Office for U.S. Appl. No. 12/860,418 dated Feb. 22, 2013 (14 pages).
Final Rejection from the United States Patent and Trademark Office for U.S. Appl. No. 12/860,418 dated Dec. 6, 2012 (7 pages).
Office Action from the United States Patent and Trademark Office for U.S. Appl. No. 12/860,362 dated Jul. 19, 2012 (23 pages).
Harland, David M., Lorenz, Ralph D., "Space Systems Failures", Springer Praxis Books, 2005, Part Two, 211-226, available at http://www.springerlink.com/content!n886138036412186/.

(56) References Cited

OTHER PUBLICATIONS

Office Action from the United States Patent and Trademark Office for U.S. Appl. No. 12/860,370 dated Jul. 5, 2012 (21 pages).
Office Action from the United States Patent and Trademark Office for U.S. Appl. No. 12/860,376 dated Aug. 3, 2012 (24 pages).
Notice of Allowance from the United States Patent and Trademark Office for U.S. Appl. No. 12/860,389 dated May 15, 2012 (8 pages).
Office Action from the United States Patent and Trademark Office for U.S. Appl. No. 12/860,418 dated Jul. 5, 2012 (23 pages).
EP10173775 European Search Report dated Feb. 18, 2013, 2 pages.
Notice of Allowance from the United States Patent and Trademark Office for U.S. Appl. No. 12/860,370 dated Dec. 6, 2013 (12 pages).
Final Rejection from the United States Patent and Trademark Office for U.S. Appl. No. 12/860,396 dated Jan. 2, 2014 (6 pages).
EP10173774.0 European Office Action dated Jan. 16, 2014, 4 pages.

* cited by examiner

GOOD CHECKING FOR VEHICLE STEERING ANGLE SENSOR

RELATED APPLICATION

The present application claims the benefit of prior filed U.S. Provisional Patent Application No. 61/236,409 filed on Aug. 24, 2009, the entire content of which is hereby incorporated by reference.

This application is related to the following United States Patent Applications: United States Patent Applications: U.S. patent application Ser. No. 12/860,362, filed on Aug. 20, 2010 entitled GOOD CHECKING FOR VEHICLE WHEEL SPEED SENSORS; and U.S. patent application Ser. No. 12/860,370, filed on Aug. 20, 2010 and entitled GOOD CHECKING FOR VEHICLE LONGITUDINAL ACCELERATION SENSOR; and U.S. patent application Ser. No. 12/860,376, filed on Aug. 20, 2010 and entitled GOOD CHECKING FOR VEHICLE LATERAL ACCELERATION SENSOR; and U.S. patent application Ser. No. 12/860,389, filed on Aug. 20, 2010 and entitled GOOD CHECKING FOR VEHICLE BRAKE LIGHT SWITCH; and U.S. patent application Ser. No. 12/860,396, filed on Aug. 20, 2010 and entitled GOOD CHECKING FOR VEHICLE PRESSURE SENSOR; and U.S. patent application Ser. No. 12/860,418, filed on Aug. 20, 2010 and entitled GOOD CHECKING FOR VEHICLE YAW RATE SENSOR.

BACKGROUND

Modern vehicles include computer systems for controlling engine emissions, vehicle braking, and a variety of other items. Each of these systems requires data in order to function, such as oxygen level data for controlling engine emissions and wheel speed data for controlling braking. This data is generally supplied by sensors located throughout the vehicle. To ensure the integrity of the data provided by the sensors, controllers perform malfunction testing on the sensors (or the signals or data the sensors provide). If a sensor malfunction is detected (e.g., there is an error in the sensor output or sensor data), a warning light or similar indicator can be activated.

SUMMARY

While current vehicle systems are designed to monitor the functioning or operation of vehicle sensors and determine when a sensor malfunction occurs, such systems lack, at least in general, robust abilities for determining when the sensor malfunction ends. For example, a sensor malfunction might be caused by a powerful source of electromagnetic interference ("EMI"). Such a circumstance might occur if a vehicle passes near an electrical power generation plant, a radar or broadcast installation, or similar location. Once the vehicle moves outside the range of the EMI, the output from the sensor might return to within an acceptable range. However, in many vehicles, once a sensor malfunction occurs, the only way in which the malfunction or error may be cleared is to have a mechanic or technician access the system, check its operation, and perform an act that resets the system or otherwise removes the error.

A check of the sensor signal based on a re-detection by the failure monitoring function can be used as a mechanism to determine if a sensor has returned to normal operation. However, "good checking" is more than this. In general, malfunction monitoring functions are designed to avoid misdetection. On the other hand, "good check" functions are, in general, designed to avoid a false good check, i.e., a good check function has smaller tolerances for deviations and fewer conditions on the driving situation to perform the evaluation. Or, in other words, the tolerances and conditions used in good checking are different than those used to detect a malfunction.

Embodiments of the invention provide a mechanism for automatically determining whether a malfunctioning sensor has returned to a normal or acceptable operating range. In the parlance of the inventors, embodiments of the invention perform a "good check" on the sensor to determine whether the sensor has returned to normal or acceptable operation after a malfunction has been detected. When a previously-malfunctioning sensor passes the "good check," warning lights (or tell-tale) indicators are shut off and systems that relied upon information from the malfunctioning sensor return to normal operation.

In one embodiment, the invention provides a controller for determining whether a previously-detected vehicle steering sensor malfunction still exists. The controller includes an electronic, non-volatile memory, and an electronic processing unit connected to the electronic, non-volatile memory. The electronic processing module includes a malfunction monitoring module, a failure handling module, and a signal checking module. The malfunction monitoring module monitors the operation of at least one vehicle sensor and generates a fault signal when the at least one sensor malfunctions. The fault signal contains fault information and causes a tell-tale indicator to be activated and/or a vehicle control system to modify its operation from a first operating state to a second state. The failure handling module causes drive cycle information and the fault information to be stored in the electronic, non-volatile memory. The signal checking module performs a signal check on information from the at least one sensor. The signal check includes retrieving drive cycle information for a steering angle sensor from the electronic, non-volatile memory and comparing an output of the steering angle sensor to a pre-determined range, the steering angle sensor passing the signal check if the output of the steering angle sensor is within the pre-determined range for a pre-determined amount of time. If the steering angle sensor passes the signal check, the controller generates a reset signal, the reset signal causing the tell-tale indicator to be deactivated and/or the vehicle control system to resume operation in the first operating state.

In some embodiments, the controller is mounted in a vehicle, and the signal check is executed only when the vehicle is traveling at a speed in excess of a predetermined speed threshold.

In some embodiments, the previously-detected vehicle steering sensor malfunction is one of an implausible sensitivity of the steering angle sensor, an implausible offset of the steering angle sensor, and a stuck signal received from the steering angle sensor. A first signal check is performed when the vehicle is traveling straight and a second signal check is performed when the vehicle is turning. The controller determines that the vehicle is traveling straight when an absolute value of a yaw rate of the vehicle is less than a pre-determined straight threshold. The controller determines that the vehicle is turning when an absolute value of a yaw rate of the vehicle is greater than a pre-determined turning threshold. A plurality of maximum yaw rates and a plurality of minimum yaw rates are maintained during each ignition cycle. The plurality of maximum yaw rates and the plurality of minimum yaw rates includes a plurality of maximum yaw rates and a plurality of minimum yaw rates when the vehicle is traveling straight, and a plurality of maximum yaw rates and a plurality of minimum yaw rates when the vehicle is turning. The plurality of yaw rates includes a yaw rate detected by a yaw rate sensor, a yaw rate calculated using data from the steering angle sensor, and a yaw rate calculated using data from a plurality of wheel speed sensors. The steering angle sensor passes the signal check when the plurality of straight maximum yaw rates and minimum yaw rates and the plurality of turning maximum yaw rates and minimum yaw rates are within a range relative to each other for a pre-determined period of time.

In some embodiments, the previously-detected vehicle steering sensor malfunction is a steering angle sensor sign fault. The signal check is executed only when the vehicle is turning. The controller determines that the vehicle is turning when an absolute value of a yaw rate of the vehicle is greater than a predetermined threshold. The controller increments a front axle integral if a difference between the steering angle sensor yaw rate and a front axle yaw rate is less than a threshold, and increments a rear axle integral if the difference between the steering angle sensor yaw rate and a rear axle yaw rate is less than a threshold. The controller decrements a front axle integral if the difference between the inverse of a steering angle sensor yaw rate and a front axle yaw rate is less than a threshold, and decrements a rear axle integral if the difference between the inverse of the steering angle sensor yaw rate and a rear axle yaw rate is less than a threshold. The steering angle sensor passes the signal check if the front axle integral and the rear axle integral exceed a threshold.

In some embodiments, the previously-detected vehicle steering sensor malfunction is a steering angle sensor offset fault. The signal check is executed if the vehicle has traveled farther than a short threshold and a steering angle sensor offset is less than a small threshold, or the vehicle has traveled farther than a long threshold and the steering angle sensor offset is less than a large threshold. The signal check is executed if a speed of the vehicle exceeds a threshold and the vehicle is traveling straight. The controller determines that the vehicle is traveling straight when an absolute value of a yaw rate of the vehicle is less than 2.0 degrees per second. The controller maintains a plurality of maximum yaw rates and a plurality of minimum yaw rates during each ignition cycle. The plurality of yaw rates includes a yaw rate detected by a yaw rate sensor, a yaw rate calculated using data from the steering angle sensor, and a yaw rate calculated using data from a plurality of wheel speed sensors. The steering angle sensor passes the signal check when the largest maximum yaw rate and the smallest minimum yaw rate are within a pre-determined range relative to each other for a pre-determined period of time. The steering angle sensor passes the signal check when a quantity of messages received by the controller that relate to the steering angle sensor is within a range for a pre-determined period of time.

Other aspects of the invention will become apparent by consideration of the detailed description and accompanying drawings.

DETAILED DESCRIPTION

Figure 1:
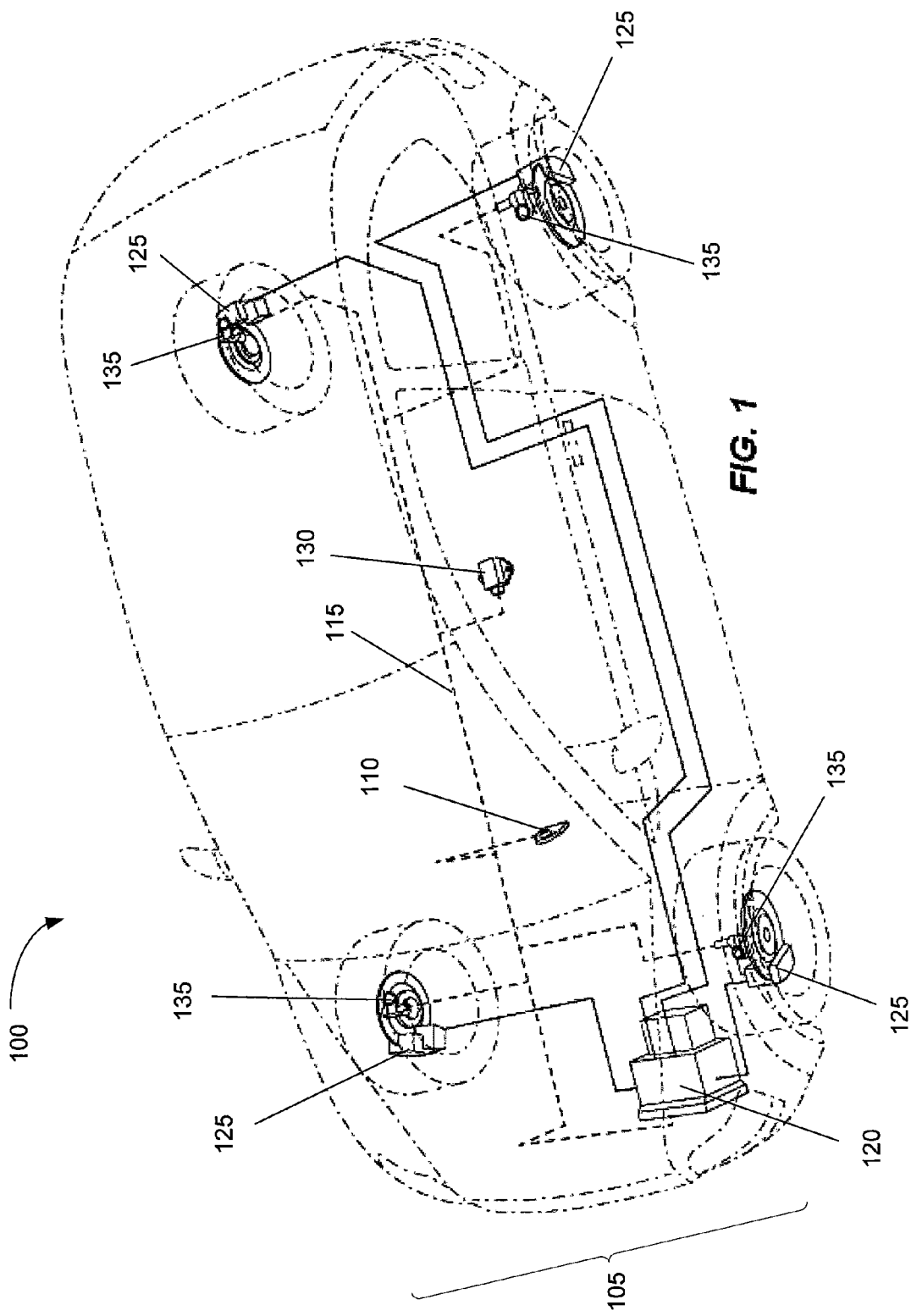
FIG. 1 is a perspective view of a vehicle including a vehicle control system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components, may be utilized to implement the invention. Further, and as described in subsequent paragraphs, the specific configurations illustrated in the drawings are intended to be exemplary embodiments of the invention. Alternative configurations are possible.

FIG. 1 illustrates a vehicle 100 including vehicle control system 105. In the example illustrated, the vehicle control system is an electronic stability control ("ESC") system. The vehicle control system 105 includes a steering angle sensor ("SAS") 110. The SAS 110 senses how far and in what direction a steering wheel has been turned. Information obtained by the SAS 110 is transmitted over a connection or network, such as a controller area network ("CAN") bus 115. A controller 120 receives information from the SAS 110 via the bus 115. The controller 120 includes an ESC application or module that is designed to detect instability of the vehicle and help correct the situation. For example, when the controller 120 detects a loss of steering control, the controller 120 may automatically apply one or more individual brakes 125 to help steer the vehicle 100 in a desired direction. In some embodiments, the controller 120 also reduces engine power when it detects a skid or slide of the vehicle 100 until the vehicle operator regains control of the vehicle 100.

As shown in FIG. 1, the vehicle control system 105 also includes additional sensors such as a yaw rate sensor ("YRS") 130, and a plurality of wheel speed sensors ("WSS") 135. The YRS 130 is connected to the bus 115 and sends information to other components also connected to the bus 115, such as the controller 120. Information sent by the YRS 130 over the bus 115 includes information about the rotational velocity of the vehicle around a vertical axis at the center of the vehicle. Each of the WSS 135 monitors a single wheel of the vehicle and is connected to the bus 115. Each WSS 135 provides information about the speed of rotation of the wheel it monitors.

Figure 2:
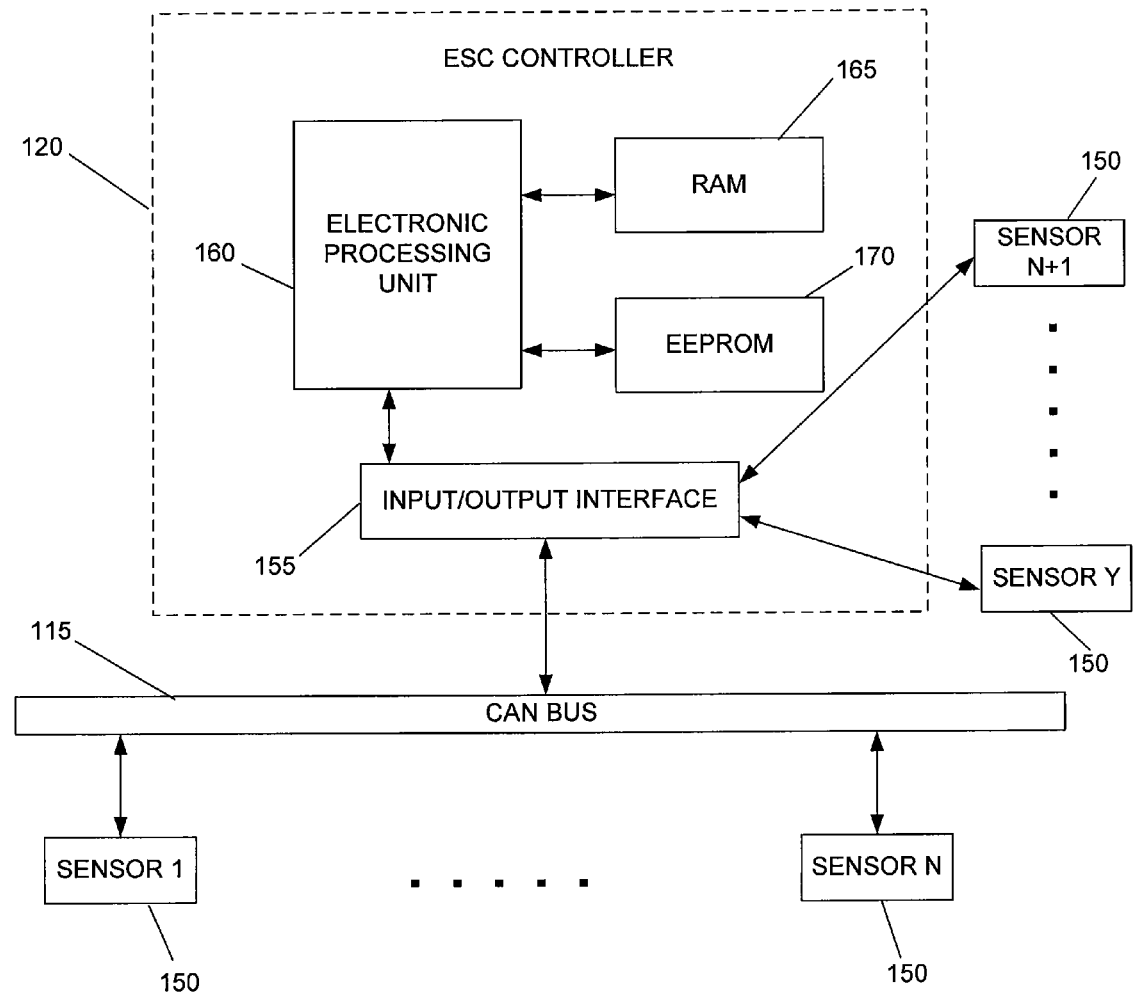
FIG. 2 schematically illustrates the vehicle control system of FIG. 1 according to one embodiment of the invention.

FIG. 2 schematically illustrates the vehicle control system 105 of FIG. 1 in greater detail. The numerous sensors depicted in FIG. 1 are represented generally by boxes 150 (Sensor 1 . . . Sensor N). The control system 105 includes the controller 120 and the bus 115. The controller 120 includes an input/output interface 155, an electronic processing unit ("EPU") 160, and one or more memory modules, such as a random access memory ("RAM") module 165 and an electronically erasable programmable read-only memory ("EEPROM") module 170. As shown in FIG. 2, the input/output interface 155 transmits and receives information over the bus 115. The EPU 160 receives the information from the input/ output interface 155 and processes the information by executing one or more applications or modules. The applications or modules can be stored in the memory. The EPU 160 also stores information (e.g., information received from the bus 115 or information generated by applications or modules executed by the EPU 160) to the memory or memory. For example, as described below, in some embodiments, the EPU 160 stores drive cycle information and fault information in the memory. Data stored in the RAM 165 is reset at the start of each new ignition cycle.

The controller 120 acquires or calculates a plurality of yaw rates for the vehicle 100. A YRS yaw rate is acquired from the YRS 130. An SAS yaw rate is calculated using data from the SAS 110 and the speed of the vehicle 100. A WSS yaw rate is calculated for each axle of the vehicle 100 (e.g., a front axle WSS yaw rate and a rear axle WSS yaw rate) based on the difference in detected speeds of wheels on opposite sides of the vehicle 100 (e.g., the difference in detected wheel speeds between the inside wheels and the outside wheels in a turn).

For each acquired or calculated yaw rate, the controller 120 stores in the memory a present yaw rate, a maximum straight yaw rate, a maximum turning yaw rate, a minimum straight yaw rate, and a minimum turning yaw rate. Although not strictly required in all implementations, each of the yaw rates is reset at the start of each new ignition cycle.

Figure 3:
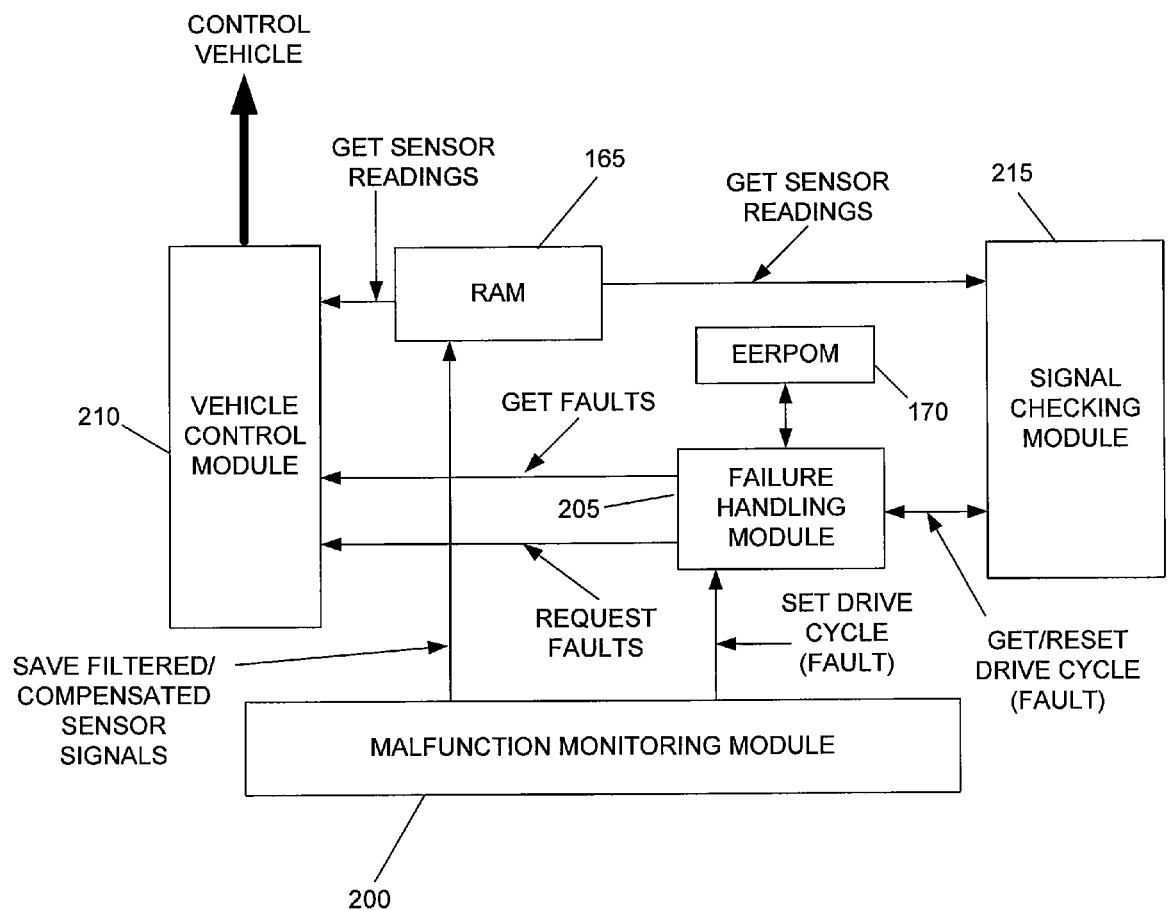
FIG. 3 schematically illustrates the functional operation of modules of the vehicle control system of FIG. 2 according to one embodiment of the invention.

In the embodiment illustrated in FIG. 3, the EPU 160 includes a malfunction monitoring module 200, a failure handling module 205, a vehicle control module 210, and a signal checking module 215. The malfunction monitoring module 200 receives sensor signals from the sensors 150 (e.g., through the input/output interface 155) and saves the sensor signals to the memory. In most embodiments, the malfunction monitoring module 200 saves filtered or compensated sensor signals to the memory. In addition, the malfunction monitoring module 200 can save raw sensor data to the memory. For example, over time a sensor 150 may become dirty or damaged, which can affect the sensor's operation. The malfunction monitoring module 155 applies an offset (positive or negative) to the signals received from a particular sensor 150 to compensate for the sensor's deterioration, and stores the compensated sensor signal to the memory.

The main function or purpose of the malfunction monitoring module 200 is to determine if a particular sensor is malfunctioning or faulty. For example, if a sensor's offset becomes too large, the malfunction monitoring module 200 may determine that the sensor 150 is no longer reliable, and therefore is malfunctioning. A variety of algorithms and techniques for determining whether a sensor is malfunctioning can also be used, including those disclosed in U.S. Pat. No. 6,834,221.

When the malfunction monitoring module 200 detects a malfunctioning or faulty sensor, the module 200 generates a fault signal and sends the fault signal to the fault handling module 205. The fault signal includes fault information based on the particular fault or malfunction observed by the malfunction monitoring module 200. The failure handling module 205 stores the fault information and corresponding counter information (which is referred to as "drive cycle information") in the memory. The drive cycle information indicates what signal check functions should be performed by the signal checking module 215 during the next drive cycle (e.g., the next time during which malfunction testing is performed) to determine whether a previously-detected fault still exists. For example, if the malfunction monitoring module 200 detects that the SAS 110 is malfunctioning and generates a fault signal, the fault or failure handling module 205 saves drive cycle information to the memory, indicating that the signal checking module 215 should check the SAS 110 during a subsequent cycle to determine whether the previously-detected SAS fault still exists.

Based on faults detected by the malfunction monitoring module 200, the vehicle control module 210 activates one or more warning lights or tell-tales in the vehicle 100 (e.g., on the vehicle's dashboard or instrument panel) that alert the vehicle operator that there is a problem. The vehicle control module 210 may also modify its operation of a particular control system or process, such as ESC functions. For example, if a particular sensor 150 is malfunctioning, the vehicle control module 210 may change the operation of an ESC function from a first operating state (e.g., fully functional and active) to a second operating state (e.g., partial functionality or inactive). In some embodiments, the first operating state includes fully active and functional control where the vehicle control module 210 considers all data from all sensors 150 providing vehicle information relevant to a particular ESC function. The second operating state can include an intermediate functional state where the vehicle control module 210 ignores sensor information from one or more particular malfunctioning sensors but continues to perform ESC functions using data from other functioning sensors or constants (e.g., when data necessary to perform particular ESC functions cannot be derived from other sensors 150). Alternatively, the second operating state can include a deactivated state. In some embodiments, the vehicle control module 210 can deactivate one or more ESC functions if a sensor 150 important to that function is malfunctioning and, thus, causing a lack of proper information for the ESC to function properly. If the vehicle control module 210 deactivates one or more ESC functions, or other types of vehicle control or monitoring functionality, the vehicle control module 210 can activate one or more warning lights or tell-tales that warn the vehicle operator of the modified operating state.

When ESC functions are operational (e.g., the vehicle control module 210 is monitoring for oversteer and understeer conditions), the vehicle control module 210 obtains current sensor readings from the memory. In some embodiments, the vehicle control module 210 may also or alternatively obtain current sensor readings from the malfunction monitoring module 200, the bus 115 and/or one or more sensors 150 directly (e.g., via the input/output interface 155). If the vehicle control module 210 is ignoring particular sensor information, based on currently detected faults, the vehicle control module 210 does not need to request this sensor information or can simply ignore any such sensor information it receives.

The signal checking module 215 performs various signal checks to determine whether a previously-detected sensor malfunction still exists. As shown in FIG. 3, as part of a signal check, the signal checking module 215 retrieves drive cycle information stored in the memory. In some embodiments, the signal checking module 215 is initialized during each new ignition cycle, and retrieves the stored drive cycle information upon each initialization. In other embodiments, the signal checking module 215 retrieves stored drive cycle information from the memory at various times while the controller 120 is operating, and the signal checking module 215 performs signal checks based on the stored drive cycle information continuously or at designated times (e.g., a next ignition cycle, or once every 10 milliseconds).

As described below with respect to FIGS. 4-7, after the signal checking module 215 retrieves stored drive cycle information from the memory, the module 215 executes one or more signal check functions to determine whether a previously-detected fault still exists. As part of executing signal check functions, the signal checking module 215 retrieves current sensor readings from the memory (as stored by the malfunction monitoring module 200).

In some embodiments, the signal checking module 215 can retrieve current sensor information or readings from the malfunction monitoring module 200 the bus 115 and/or one or more sensors 150 directly (i.e., via the input/output interface 155). The current sensor readings can include compensated or filtered sensor signals or information, raw sensor information, current sensor offsets, and/or other statistical information about a particular sensor 150.

In some embodiments, the signal checking module 215 retrieves current sensor readings from the previously-detected malfunctioning sensor. The signal checking module 215 also retrieves current sensor readings from sensors other than the previously-detected malfunctioning sensor, and uses information from functioning sensors to determine whether a sensor 150 having a previously-detected fault is still malfunctioning.

If the signal checking module 215 determines that the fault doesn't exist anymore, it resets the corresponding fault information, drive cycle information, or both in the memory to indicate that the previously-detected malfunction no longer exists. The failure handling module 205 receives the reset signal and updates the fault information and/or drive cycle information in the memory to indicate that the previously-detected fault no longer exists (e.g., by deleting the previous fault and/or drive cycle information or setting a fault bit or flag to an "okay" or "no fault" value). When the vehicle control module 210 subsequently requests the current faults from the failure handling module 205, the failure handling module 205 informs the vehicle control module 210 that the sensor 150, for which there was a previously-detected fault, is functioning properly (e.g., no longer identifies the sensor as malfunctioning). The vehicle control module 210 re-assesses the current faults and deactivates a previously-activated warning light or tell-tale within the vehicle 100 and/or returns its operation back to a first or original operating state (e.g., a fully active and functional state).

If the signal checking module 215 performs one or more signal check functions related to a particular fault and determines that the fault still exists, the signal checking module 215 does not change the corresponding fault and/or drive cycle information in the memory. Thus, the fault and/or drive cycle information remains in the same condition as before the signal checking module 215 performed the required signal checks.

In some embodiments, when a SAS malfunction is detected, one or more tell-tale indicators or warning lights can be illuminated (e.g., using one or more colors such as yellow and/or red) to indicate to a driver the status of various ESC functions (e.g., anti-lock braking) which rely on data from the SAS. The states of the warning lights can indicate to the driver which of the ESC functions are compromised, and which remain operational.

In one exemplary embodiment, when a SAS fault is detected, an ESC failure tell-tale light is illuminated. Because the malfunction relates to the SAS 110, there is limited affect on braking systems. Thus, a brake warning light and an ABS warning light may not be illuminated. By itself, a malfunction of the SAS 110 also has little effect on the ESC functions related to braking. Thus, an ESC failure light may not be illuminated. The warning light status display can also include an ESC off light. The ESC off light may be illuminated when the ESC function is deactivated, such as when a user has manually turns the ESC function off.

The malfunction monitoring module 200 detects multiple SAS 110 faults—an offset error, a sensitivity error, a stuck signal error, a sign error, and a message counter error.

Figure 4:
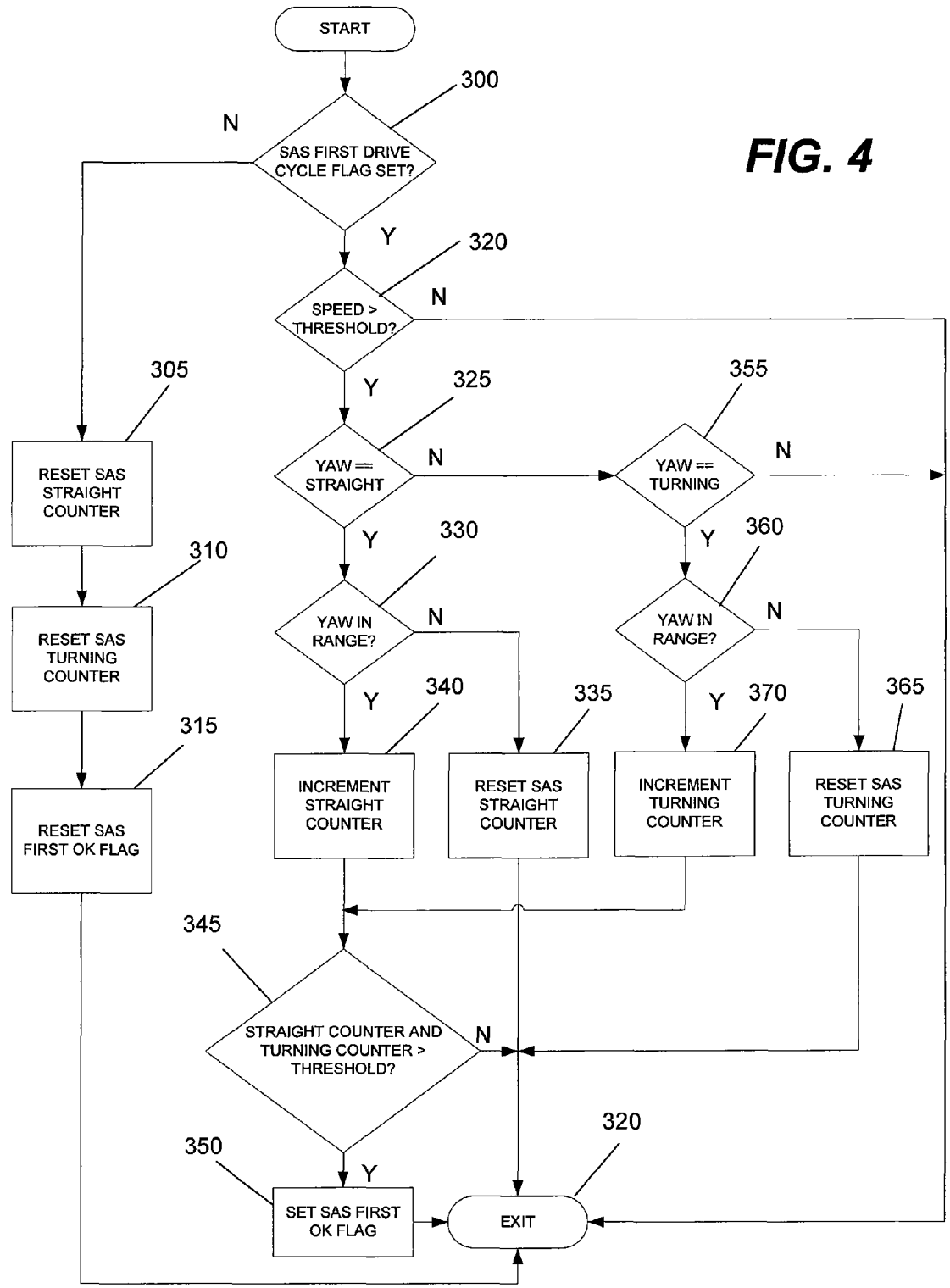
FIG. 4 is a flow chart illustrating a first steering angle sensor signal check function according to an embodiment of the invention.

FIG. 4 shows an embodiment of the operation of the signal checking module 215 for detecting if a previously-detected first (or generic) SAS error still exists. When the malfunction monitoring module 200 determines that a first SAS fault has occurred, the malfunction monitoring module 200 sets a first SAS drive cycle flag. The signal checking module 215 performs checks on previously-detected faults (e.g., continuously or once each pre-determined time period). One of the checks the signal checking module 215 performs is a first SAS signal check. The signal checking module 215 begins by checking if the first SAS drive cycle flag is set (step 300). If the first SAS drive cycle flag is not set (i.e., a first SAS fault has not been detected), the signal checking module 215 resets (i.e., zeros) a SAS straight counter (step 305), a SAS turning counter (step 310), and a first SAS OK flag (step 315). The first SAS signal check is then exited (step 320).

If, at step 300, the first SAS drive cycle flag is set (i.e., a first SAS fault has previously been detected), the signal checking module 215 determines if the first SAS fault no longer exists. Generally, the signal checking module 215 compares the yaw rate received from the YRS 130 and the calculated WSS yaw rates. All of these yaw rates must be within a predefined range, relative to each other, for it to be confirmed that the fault no longer exists. To check for an invalid offset error, the yaw rates are checked when the vehicle is moving in a straight direction. To check for a sensitivity error, the yaw rates are checked when the vehicle is turning. And to check for a stuck signal error, the yaw rates are checked both when the vehicle is moving in a straight direction and when the vehicle is turning. Each of the straight and turning tests must produce an error free condition for a pre-determined period of time for the signal checking module 215 to determine that the fault no longer exists. In addition, the tests are performed only when the vehicle is traveling at a speed greater than a threshold (e.g., 5 to 50 kilometers per hour). The speed threshold ensures that values used in the tests are valid (e.g., that other modules/sensors have updated their values). In addition, yaw values are larger at higher rates of speed, enabling more accurate testing of the SAS.

Referring back to FIG. 4, the signal checking module 215 determines if the speed of the vehicle is above the speed threshold (step 310). If the speed of the vehicle does not exceed the threshold, signal checking of the first SAS faults is not performed, and the signal checking module 215 exits the first SAS signal check (step 320). If the speed of the vehicle is above the threshold, the signal checking module 215 checks if the vehicle is traveling straight (step 325). In some embodiments, the signal checking module 215 determines if the vehicle is traveling straight if an absolute value of the yaw rate detected by the YRS 130 is less than a threshold (e.g., 0.5 to 5.0 degrees per second). If, at step 325, the signal checking module 215 determines that the vehicle is traveling in a straight direction, the signal checking module 215 determines if the minimum and maximum straight yaw rates calculated by the SAS 110 and the WSS 135, and the yaw rate from the YRS 130 are within a pre-defined range (step 330). In some embodiments, the range (e.g., 0.5 to 5.0 degrees per second) is checked using the largest of the maximum straight yaw rates and the smallest of the minimum straight yaw rates. If, at step 330, the maximum and minimum straight yaw rates are not within the range (i.e., a first SAS fault still exists), the signal checking module 215 resets the SAS straight counter (step 335), and exits the first SAS signal check (step 320).

If the signal checking module 215 determines that the maximum and minimum straight yaw rates are within the range, the signal checking module 215 increments the SAS straight counter (step 340).

The signal checking module 215 then checks if the maximum and minimum straight yaw rates have been within the range for a pre-determined period of time (e.g., 5 to 5000 milliseconds) while the vehicle was traveling straight and the maximum and minimum turning yaw rates have been within the range for a pre-determined period of time (e.g., 5 to 5000 milliseconds) while the vehicle was turning (step 345). If either the straight or turning yaw rates have not been within their pre-determined ranges for the pre-determined time periods, the signal checking module 215 simply exits the first SAS signal check (step 320). However, if both the straight and turning yaw rates have been within their pre-determined ranges for the pre-determined time periods, the signal checking module 215 sets the first SAS "OK" flag (step 350), causing the first SAS fault to be reset.

If, at step 325, the signal checking module 215 determined that the vehicle was not traveling straight, the signal checking module 215 then determines if the vehicle is turning (step 355). In some embodiments, the signal checking module 215 determines if the vehicle is turning if absolute value of a yaw rate detected by the YRS 130 is greater than a threshold (e.g., 5.0 to 15.0 degrees per second). If, at step 355, the signal checking module 215 determines that the vehicle is turning, the signal checking module 215 determines if the minimum and maximum turning yaw rates calculated using data from the SAS 110 and the WSS 135, and the yaw rate from the YRS 130 are within a pre-defined range (step 360). In some embodiments, the range (e.g., 0.5 to 5.0 degrees per second) is checked using the largest of the maximum turning yaw rates and the smallest of the minimum turning yaw rates. If, at step 360, the maximum and minimum turning yaw rates are not within the range (i.e., a SAS fault still exists), the signal checking module 215 resets a SAS turning counter (step 365), and exits the first SAS signal check (step 320). If the signal checking module 215 determines that the maximum and minimum turning yaw rates are within the range, the signal checking module 215 increments the SAS turning counter (step 370).

After checking the turning yaw rates, the signal checking module 215 checks the SAS straight and turning counters to determine if the maximum and minimum straight yaw rates have been within the range for a pre-determined period of time (e.g., 5 to 5000 milliseconds) while the vehicle was traveling straight and the maximum and minimum turning yaw rates have been within the range for a pre-determined amount of time (e.g., 5 to 5000 milliseconds) while the vehicle was turning (step 345). If either the straight or turning yaw rates have not been within their pre-determined ranges for the pre-determined times, the signal checking module 215 exits the first SAS signal check (step 320). However, if both the straight and turning yaw rates have been within their pre-determined ranges for at least the pre-determined times, the signal checking module 215 sets the first SAS "OK" flag (step 350) causing the first SAS fault to be reset.

Figure 5:
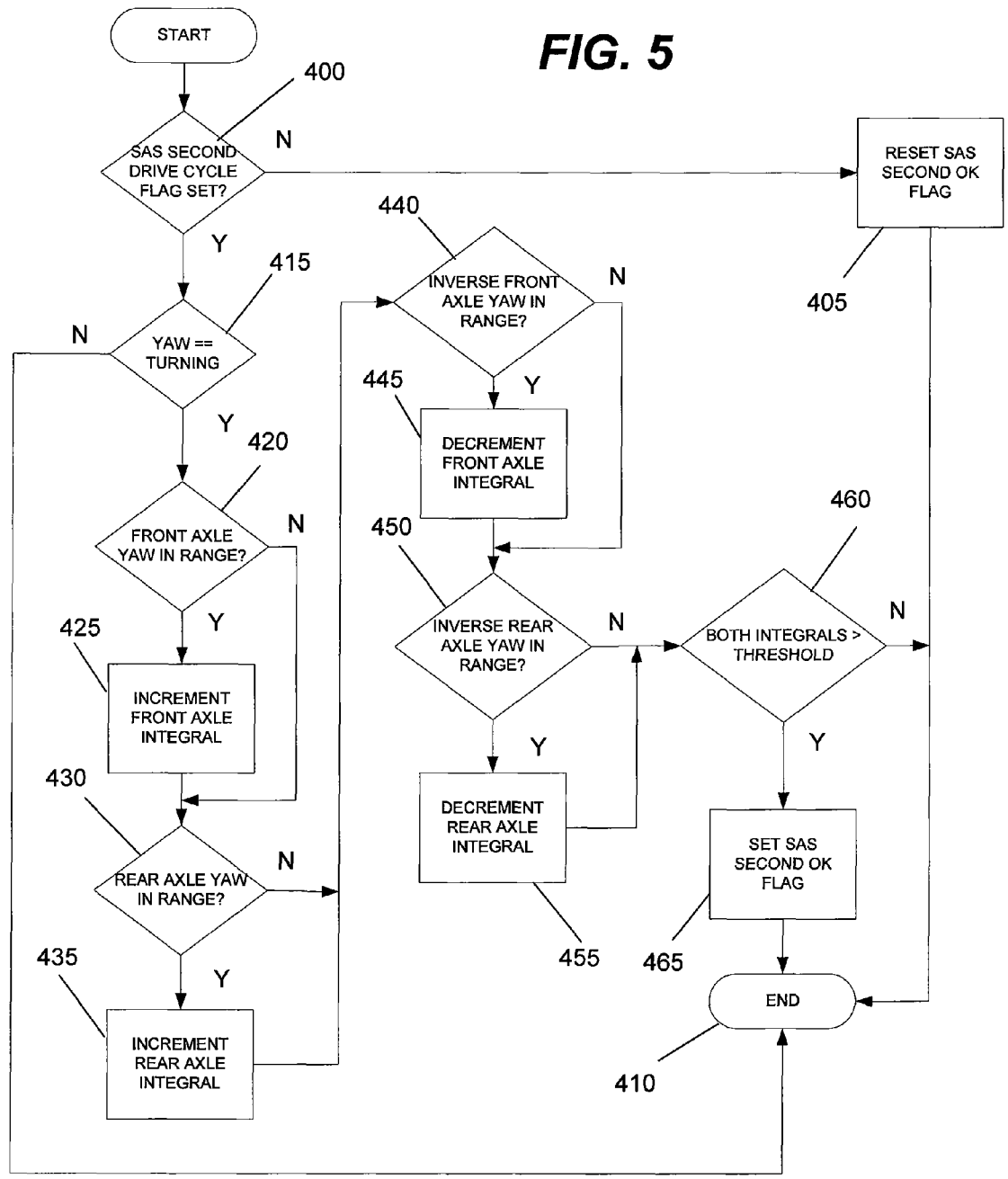
FIG. 5 is a flow chart illustrating a second steering angle sensor signal check function according to an embodiment of the invention.

FIG. 5 shows an embodiment of the operation of the signal checking module 215 for determining if a previously-detected second (or SAS sign) SAS fault still exists. When the malfunction monitoring module 200 determines that a second SAS fault has occurred, the malfunction monitoring module 200 sets a second SAS drive cycle flag. The signal checking module 215 checks if the second SAS drive cycle flag is set (step 400). If the second SAS drive cycle flag is not set, the signal checking module 215 resets a second SAS ok flag (step 405) and exits the second SAS signal check (step 410). If, at step 400, the signal checking module 215 determines that the second SAS drive cycle flag is set, the signal checking module 215 determines if the vehicle is turning (step 415). The second SAS fault can only be checked when the vehicle is turning because the SAS signal can fluctuate between a low positive value and a low negative value when the vehicle is traveling straight. In some embodiments, the signal checking module 215 determines that the vehicle is turning when an absolute value of the yaw rate from the YRS 130 is greater than a threshold (e.g., 2.0 to 5.0 degrees per second). If the signal checking module 215 determines that the vehicle is not turning, the signal checking module 215 exits the second SAS signal check (step 410). However, if the vehicle is turning, the signal checking module 215 determines if SAS yaw rate is within a range of the front axle WSS yaw rate (step 420). In some embodiments, the signal checking module 215 determines that the SAS yaw rate is within the range of the WSS yaw rate if the SAS yaw rate is greater than the WSS yaw rate minus a constant (e.g., 0.5 to 5.0 degrees per second) and is less than the WSS yaw rate plus a constant (e.g., 0.5 to 5.0 degrees per second). If the SAS yaw rate is within the range of the front axle WSS yaw rate (step 420), the signal checking module 215 increments a front axle integral (step 425). In some embodiments, the signal checking module 215 increments the front axle integral by an amount equal to the front axle WSS yaw rate multiplied by another constant (e.g., 0.01 to 0.50).

Following incrementing the front axle integral (step 425) or if the SAS yaw rate was not within the range of the front axle WSS yaw rate, the signal checking module 215 determines if the SAS yaw rate is within a range of the rear axle WSS yaw rate (step 430). In some embodiments, the SAS yaw rate is within the range of the rear axle WSS yaw rate if the SAS yaw rate is greater than the rear axle WSS yaw rate minus a constant (e.g., 0.5 to 5.0 degrees per second) and is less than the rear axle WSS yaw rate plus a constant (e.g., 0.5 to 5.0 degrees per second). If the SAS yaw rate is within the range of the rear axle WSS yaw rate (step 430), the signal checking module 215 increments a rear axle integral (step 435). In some embodiments, the signal checking module 215 increments the rear axle integral by an amount equal to the rear axle WSS yaw rate multiplied by another constant (e.g., 0.01 to 0.50).

Following incrementing the rear axle integral (step 435) or if the SAS yaw rate was not within the range of the rear axle WSS yaw rate, the signal checking module 215 determines if the inverse of the SAS yaw rate is within a range of front axle WSS yaw rate (step 440). In some embodiments, the signal checking module 215 determines that the inverse SAS yaw rate is within the range of the front axle WSS yaw rate if the inverse SAS yaw rate is greater than the front axle WSS yaw rate minus a constant (e.g., 0.5 to 5.0 degrees per second) and is less than the front axle WSS yaw rate plus a constant (e.g., 0.5 to 5.0 degrees per second). If the inverse SAS yaw rate is within the range of the front axle WSS yaw rate (step 440) (e.g., the sign of the SAS 110 is incorrect), the signal checking module 215 decrements the front axle integral (step 445). In some embodiments, the signal checking module 215 decrements the front axle integral by an amount equal to the front axle WSS yaw rate multiplied by another constant (e.g., 0.01 to 0.50).

Following decrementing the front axle integral (step 445) or if the inverse SAS yaw rate was not within the range of the front axle WSS yaw rate, the signal checking module 215 determines if the inverse of SAS yaw rate is within a range of the rear axle WSS yaw rate (step 450). In the embodiment shown, the inverse SAS yaw rate is considered to be within the range if the yaw rate is greater than the rear axle WSS yaw rate minus a constant (e.g., 0.5 to 5.0 degrees per second) and is less than the rear axle WSS yaw rate plus a constant (e.g., 0.5 to 5.0 degrees per second). If the inverse SAS yaw rate is within the range of the rear axle WSS yaw rate (step 450) (e.g., the sign of the SAS 110 is incorrect), the signal checking module 215 decrements the rear axle integral (step 455). In some embodiments, the signal checking module 215 decrements the rear axle integral by an amount equal to the rear axle WSS yaw rate multiplied by another constant (e.g., 0.01 to 0.50).

After step 455 or if the inverse SAS yaw rate is outside the range of rear axle WSS yaw rate, the signal checking module 215 checks if both the front axle integral and the rear axle integral exceed a threshold (step 460) (e.g., 120 to 240 degrees). If the axle integrals do not exceed the threshold, the signal checking module 215 exits the signal check (step 410). If both of the axle integrals exceed the threshold, the signal checking module 215 sets a second SAS "OK" flag (step 465) before exiting the signal check.

Figure 6A:
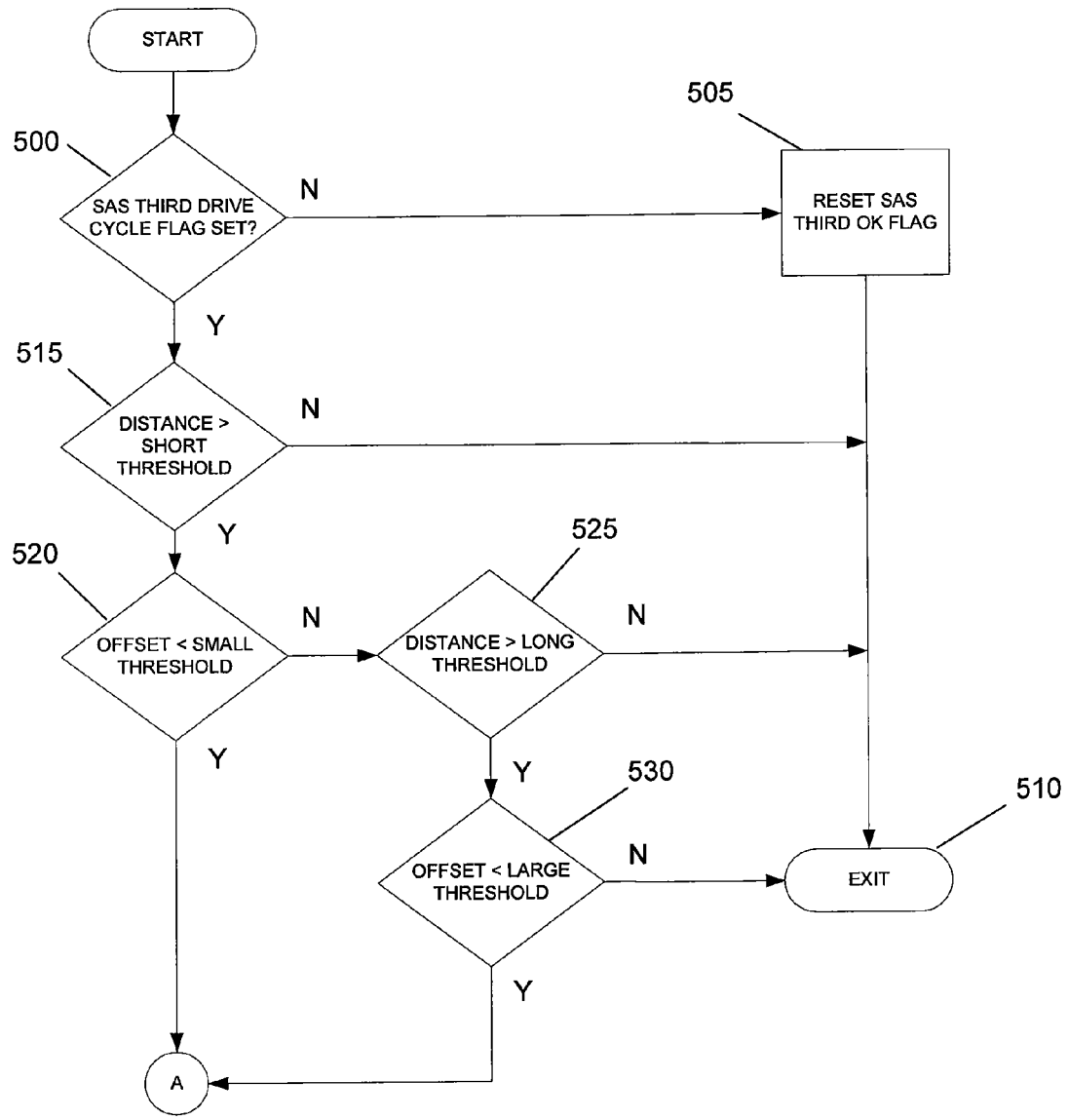
FIGS. 6A and 6B are a flow chart illustrating a third steering angle sensor signal check function according to one embodiment of the invention.
Figure 6B:
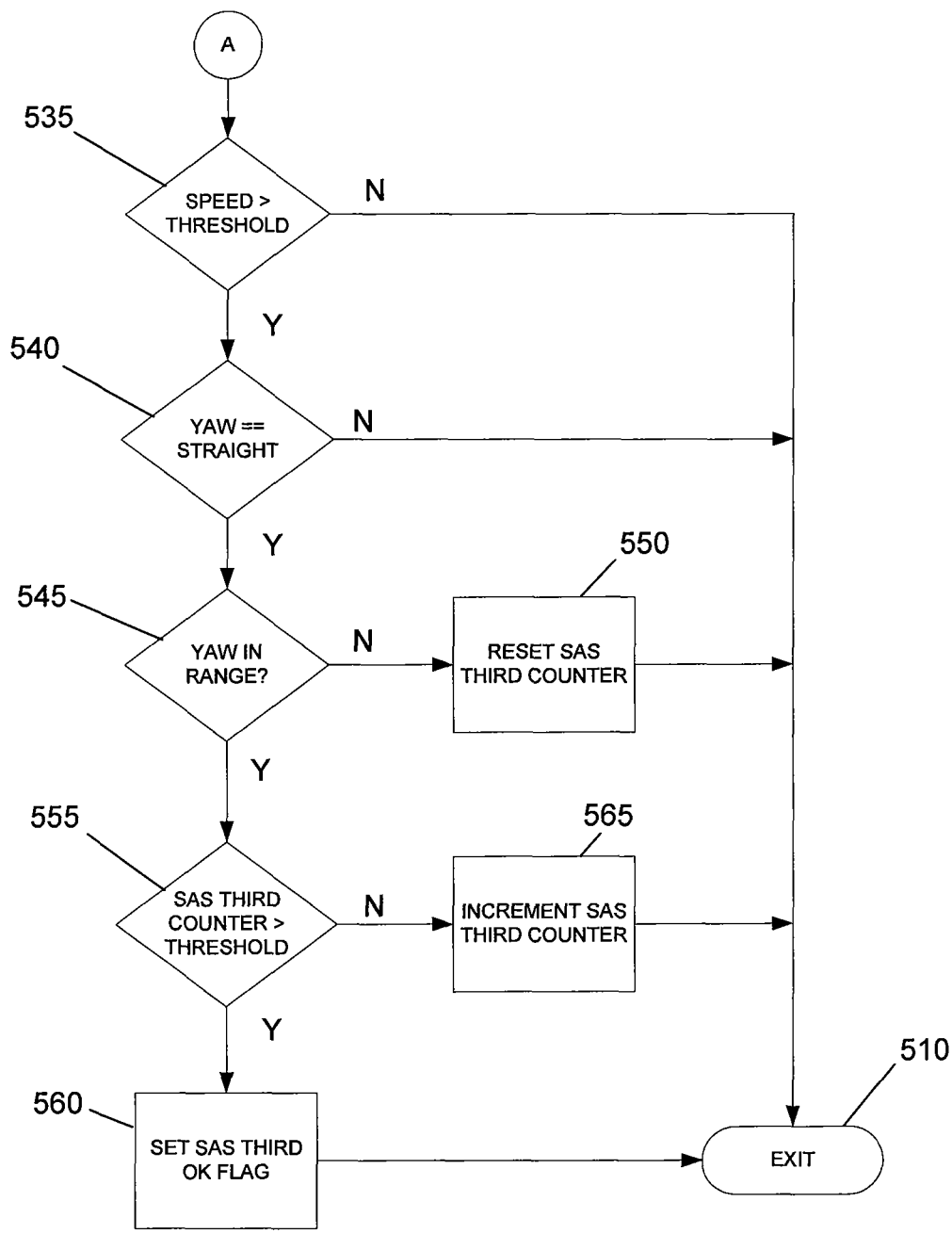

FIGS. 6A and 6B illustrate, for one embodiment, how the signal checking module 215 determines if a previously-detected third (or SAS long-term compensation) SAS fault still exists. In the first step, the signal checking module 215 evaluates whether the third SAS drive cycle flag is set (step 500). If the third SAS drive cycle flag is not set, the signal checking module 215 resets a third SAS "OK" flag (step 505) and exits the process (step 510). If the third SAS drive cycle flag is set, the signal checking module 215 checks whether the vehicle has traveled more than a pre-determined distance (a "short distance threshold" or "first distance") (e.g., 0.5 to 5.0 kilometers) since the last ignition cycle (step 515). If the vehicle has not traveled farther than the threshold, the signal checking module 215 exits the third SAS signal check (step 510). If the vehicle has traveled farther than the short distance threshold, the signal checking module 215 checks if the LTC offset is less than a small or degree threshold (step 520) (e.g., 5.0 to 10.0 degrees). The signal checking module 215 performs the check by comparing the absolute value of the offset to the threshold (e.g., |offset|<threshold). If the offset is not less than the small threshold, the signal checking module 215 checks if the vehicle has traveled a second distance (a "long distance threshold"). The long distance threshold is greater than the short distance threshold (step 525) (e.g., 10.0 to 50.0 kilometers). If the vehicle has not traveled farther than the second distance, the third signal check is exited (step 510).

If the vehicle has traveled farther than the second distance, the signal checking module 215 checks if the LTC offset is less than a large threshold (step 530) (e.g., +/−7.0 to 15.0 degrees). In some embodiments, the determination is made by comparing the absolute value of the offset to the threshold (e.g., |offset|<large threshold). If the offset is not less than the large threshold, the process is exited (step 510). The large threshold can be less than a threshold at which the malfunction monitoring module 200 determines that there is a third SAS offset fault (e.g., a third SAS offset>a threshold, e.g., 10 to 30 degrees).

The signal checking module 215 determines whether the vehicle is traveling faster than a speed threshold (step 535) if (1) the vehicle had traveled farther than the first distance and the offset is less than the small threshold at step 520 or (2) if the vehicle had traveled farther than the second distance and the offset was less than the large threshold at step 530. The third SAS signal check is performed only when the vehicle is traveling at a speed greater than a threshold (e.g., 5 to 50 kilometers per hour). The speed threshold ensures that values used in the tests are valid (e.g., that other modules/sensors have updated their values). In addition, yaw values are larger at higher rates of speed, enabling more accurate testing of the third SAS signal check.

If the speed of the vehicle does not exceed the threshold, tests of the third SAS signal check are not performed, and the signal checking module 215 exits the third SAS signal check (step 510). If the speed of the vehicle is above the threshold, the signal checking module 215 checks if the vehicle is traveling straight (step 540). In some embodiments, the signal checking module 215 determines if the vehicle is traveling straight if a yaw rate detected by the YRS 130 is less than a threshold (e.g., 0.5 to 5.0 degrees per second). If, at step 540, the signal checking module 215 determines that the vehicle is traveling in a straight direction, the signal checking module 215 determines if the minimum and maximum straight yaw rates calculated using data from the SAS 110 and the WSS 135, and the yaw rate from the YRS 130 are within a predefined range (step 545).

The allowable range between the largest of the maximum straight yaw rates and the smallest of the minimum straight yaw rates is, in certain embodiments, less than a threshold (e.g., 0.5 to 5.0 degrees per second). If the maximum and minimum straight yaw rates are not within the range (i.e., a third SAS fault still exists) (step 545), the signal checking module 215 resets the third SAS counter (step 550), and exits the signal check (step 510). However, if the yaw rates are within the range, the signal checking module 215 checks if the yaw rates have been within the range for a minimum time period by checking if a third SAS counter exceeds a threshold (step 555) (e.g., 50 to 5000 milliseconds). If the yaw rates have been within the range for the minimum time period, the signal checking module 215 sets the third SAS "OK" flag (step 560) and exits the third SAS signal check (step 510). If the yaw rates have not been within the range for the minimum time, the signal checking module 215 increments the third SAS counter (step 565) and exits the third SAS signal check (step 510).

Figure 7:
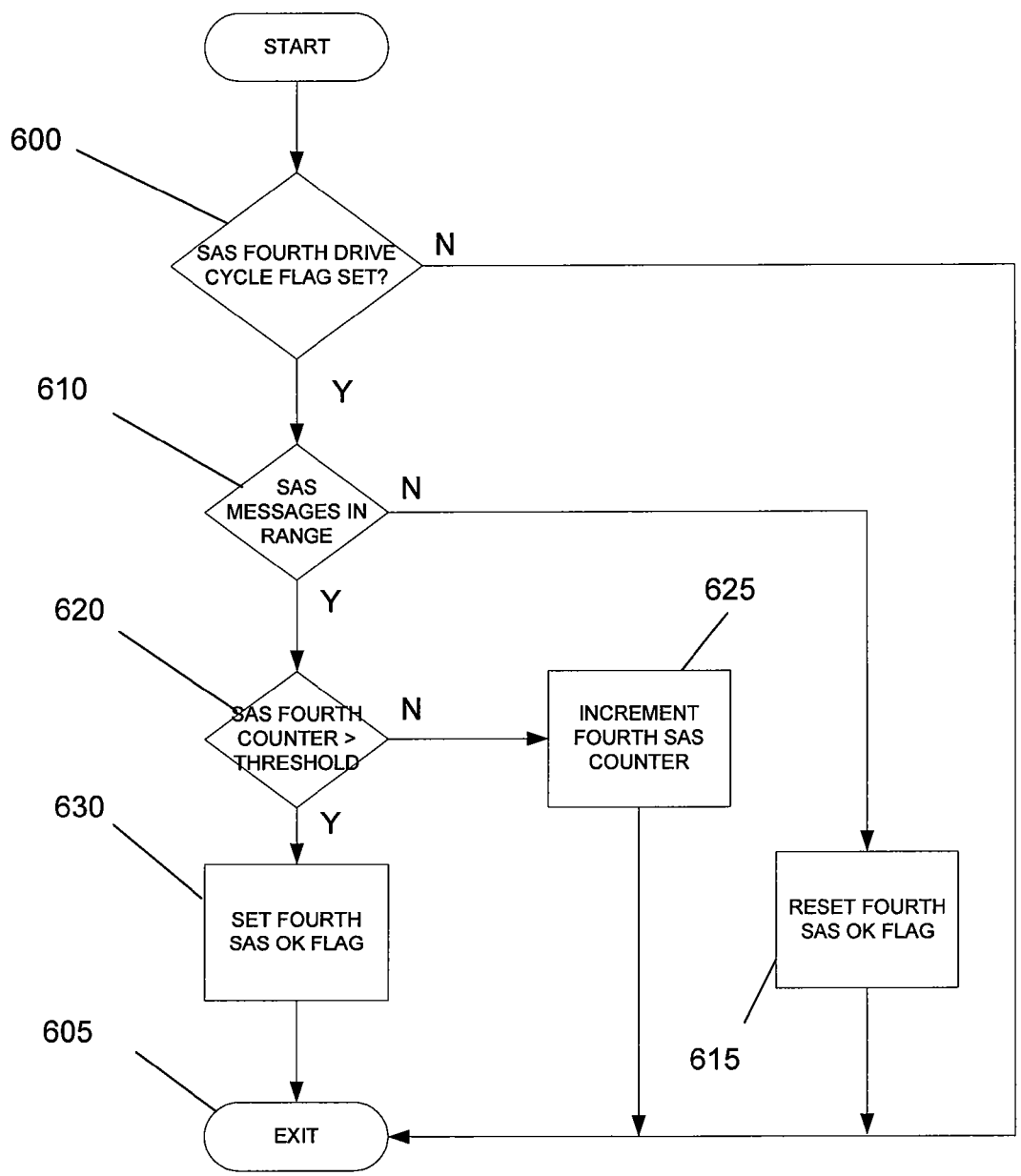
FIG. 7 is a flow chart illustrating a fourth steering angle sensor signal check function according to an embodiment of the invention.

FIG. 7 illustrates good checking for fourth SAS faults. The signal checking module 215 checks if a fourth (or counter) SAS drive cycle flag is set (step 600). If the fourth SAS drive cycle flag is not set, the fourth SAS signal check is exited (step 605). If the fourth SAS drive cycle flag is set, the signal checking module 215 checks if the number of messages received related to the SAS is within a permissible range (step 610). If the number of messages received is not within the permissible range, the signal checking module 215 resets a fourth SAS counter (step 615) and exits the signal check (step 605).

If the messages received are within the permissible range, the signal checking module 215 determines if the messages received have been in the permissible range for a pre-determined amount of time or period (step 620) (e.g., 0.5 to 5.0 seconds). If the elapsed time is less than the pre-determined period, the signal checking module 215 increments the fourth SAS counter (step 625) and exits the (step 605). If the elapsed time is greater than the pre-determined period, the signal checking module 215 sets a fourth SAS "OK" flag (step 630) and exits the fourth SAS signal check (step 605).

In some embodiments, the failure handling module 205 detects that an SAS "OK" flag has been set by one of the functions described above. The failure handling module 205 then resets the fault and the drive cycle information in the memory for the respective SAS fault. In other embodiments, the signal checking module 215 sends a reset signal to the failure handling module 205 to reset a respective SAS fault that the signal checking module 215 determines no longer exists.

As an alternative to resetting a stuck signal SAS failure using the first SAS check, a separate steering angle stuck signal check function can verify that the SAS signal has varied more than a threshold (e.g., 3 to 15 degrees) since the start of the present ignition cycle. The controller 120 can maintain a maximum and minimum SAS reading for each ignition cycle. When an SAS stuck or constant signal fault is detected, and an SAS stuck signal drive cycle flag set, the signal checking module 215 checks if the difference between the maximum and minimum SAS readings during the present ignition cycle is greater than a threshold (e.g., 3 to 15 degrees). If the difference exceeds the threshold, a stuck signal "OK" flag is set. This causes the fault and the drive cycle to be reset.

Thus, the invention provides, among other things, a controller for determining whether a previously-detected vehicle sensor malfunction still exists by executing various signal checks and signal check functions using sensor-related information. Various features and advantages of the invention are set forth in the following claims.

What is claimed is:

1. A controller for determining whether a previously-detected vehicle steering sensor malfunction still exists, the controller comprising:
   an electronic, non-volatile memory; and
   an electronic processing unit connected to the electronic, non-volatile memory, the electronic processing module including,
   a malfunction monitoring module that monitors the operation of at least one vehicle sensor and generates a fault signal when the at least one vehicle sensor outputs a signal that is outside of a first predetermined range, the fault signal containing fault information and causing at least one of a tell-tale indicator to be activated and a vehicle control system to modify its operation from a first operating state to a second operating state,
   a failure handling module that causes drive cycle information and the fault information to be stored in the electronic, non-volatile memory, and
   a signal checking module that performs a signal check on information from the at least one vehicle sensor, the signal check including
   retrieving drive cycle information for a steering angle sensor from the electronic, non-volatile memory,
   comparing an output of the steering angle sensor to a second pre-determined range narrower than the first pre-determined range, the steering angle sensor passing the signal check if the output of the steering angle sensor is within the second pre-determined range for a pre-determined amount of time, and
   generating a reset signal, if the steering angle sensor passes the signal check, the reset signal causing at least one of the tell-tale indicator to be deactivated and the vehicle control system to resume operation in the first operating state.

2. The controller of claim 1, wherein the controller is mounted in a vehicle and a plurality of maximum yaw rates and a plurality of minimum yaw rates are maintained during each ignition cycle.

3. The controller of claim 2, wherein the signal check is executed only when the vehicle is traveling at a speed in excess of a predetermined speed threshold, wherein a first signal check is performed when the vehicle is traveling straight and a second signal check is performed when the vehicle is turning.

4. The controller of claim 3, wherein the previously-detected vehicle steering sensor malfunction is one of an implausible sensitivity of the steering angle sensor, an implausible offset of the steering angle sensor, and a stuck signal received from the steering angle sensor.

5. The controller of claim 3, wherein the controller determines that the vehicle is traveling straight when an absolute value of a yaw rate of the vehicle is less than a pre-determined straight threshold.

6. The controller of claim 3, wherein the controller determines that the vehicle is turning when an absolute value of a yaw rate of the vehicle is greater than a pre-determined turning threshold.

7. The controller of claim 2, wherein the plurality of maximum yaw rates and the plurality of minimum yaw rates includes a plurality of maximum yaw rates and a plurality of minimum yaw rates when the vehicle is traveling straight, and a plurality of maximum yaw rates and a plurality of minimum yaw rates when the vehicle is turning.

8. The controller of claim 2, wherein the plurality of yaw rates includes a yaw rate detected by a yaw rate sensor, a yaw rate calculated using data from the steering angle sensor, and a yaw rate calculated using data from a plurality of wheel speed sensors.

9. The controller of claim 2, wherein the steering angle sensor passes the signal check when the plurality of straight maximum yaw rates and minimum yaw rates and the plurality of turning maximum yaw rates and minimum yaw rates are within a range relative to each other for a pre-determined period of time.

10. The controller of claim 2, wherein the previously-detected vehicle steering sensor malfunction is a steering angle sensor sign fault.

11. The controller of claim 10, wherein the signal check is executed only when the vehicle is turning.

12. The controller of claim 11, wherein the controller determines that the vehicle is turning when an absolute value of a yaw rate of the vehicle is greater than a predetermined threshold.

13. The controller of claim 11, wherein the controller increments a front axle integral if a difference between the steering angle sensor yaw rate and a front axle yaw rate is less than a threshold, and increments a rear axle integral if the difference between the steering angle sensor yaw rate and a rear axle yaw rate is less than a threshold, the controller decrements a front axle integral if the difference between the inverse of a steering angle sensor yaw rate and a front axle yaw rate is less than a threshold, and decrements a rear axle integral if the difference between the inverse of the steering angle sensor yaw rate and a rear axle yaw rate is less than a threshold, and the steering angle sensor passes the signal check if the front axle integral and the rear axle integral exceed a threshold.

14. The controller of claim 2, wherein the previously-detected vehicle steering sensor malfunction is a steering angle sensor offset fault.

15. The controller of claim 14, wherein the signal check is executed if the vehicle has traveled farther than a short threshold and a steering angle sensor offset is less than a small threshold, or the vehicle has traveled farther than a long threshold and the steering angle sensor offset is less than a large threshold.

16. The controller of claim 14, wherein the signal check is executed if a speed of the vehicle exceeds a threshold and the vehicle is traveling straight.

17. The controller of claim 16, wherein the controller determines that the vehicle is traveling straight when an absolute value of a yaw rate of the vehicle is less than 2.0 degrees per second.

18. The controller of claim 17, wherein the plurality of yaw rates includes a yaw rate detected by a yaw rate sensor, a yaw rate calculated using data from the steering angle sensor, and a yaw rate calculated using data from a plurality of wheel speed sensors.

19. The controller of claim 17, wherein the steering angle sensor passes the signal check when the largest maximum yaw rate and the smallest minimum yaw rate are within a pre-determined range relative to each other for a pre-determined period of time.

20. The controller of claim 2, wherein the steering angle sensor passes the signal check when a quantity of messages received by the controller that relate to the steering angle sensor is within a range for a pre-determined period of time.

* * * * *